United States Patent
Surjaatmadja

(12) 
(10) Patent No.: US 6,565,129 B2
(45) Date of Patent: May 20, 2003

(54) QUICK CONNECT SYSTEM AND METHOD FOR FLUID DEVICES

(75) Inventor: Jim B. Surjaatmadja, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/886,739

(22) Filed: Jun. 21, 2001

(65) Prior Publication Data

US 2002/0195820 A1 Dec. 26, 2002

(51) Int. Cl.[7] .............................................. F16L 19/06
(52) U.S. Cl. .................... 285/373; 285/302; 285/332
(58) Field of Search ................. 285/373, 419, 285/302, 369, 332.1, 332

(56) References Cited

U.S. PATENT DOCUMENTS

| | | | | |
|---|---|---|---|---|
| 1,043,806 A | * | 11/1912 | Dahl ..................... 285/148.18 |
| 1,456,761 A | | 5/1923 | Bylund | |
| 1,646,463 A | | 10/1927 | Stokesberry | |
| 1,976,797 A | | 10/1934 | Naylor ....................... 285/194 |
| 2,295,510 A | * | 9/1942 | Ball et al. ..................... 285/27 |
| 2,338,307 A | * | 1/1944 | Staggers ...................... 285/331 |
| 2,752,174 A | | 6/1956 | Frost .......................... 285/194 |
| 3,113,791 A | | 12/1963 | Frost et al. .................. 285/112 |
| 3,154,328 A | * | 10/1964 | Masse ......................... 285/233 |
| 3,201,156 A | | 8/1965 | Coats ......................... 285/365 |
| 3,268,245 A | | 8/1966 | Wood ......................... 285/236 |
| 3,482,859 A | * | 12/1969 | Bowlin ..................... 285/332.3 |
| 3,828,403 A | | 8/1974 | Perrin et al. ................... 24/270 |
| 3,851,901 A | * | 12/1974 | Sills .......................... 285/112 |
| 4,168,090 A | * | 9/1979 | Kaufmann, Jr. ............. 285/302 |
| 4,265,471 A | * | 5/1981 | Nash .......................... 285/111 |
| 4,272,871 A | | 6/1981 | Weinhold .................... 24/270 |
| 4,284,298 A | * | 8/1981 | Kaufmann, Jr. ............. 285/302 |
| 4,358,140 A | * | 11/1982 | Jonsson ...................... 285/419 |
| 4,438,958 A | | 3/1984 | De Cenzo ................... 285/234 |
| 4,998,756 A | * | 3/1991 | Hart .......................... 285/298 |
| 5,582,440 A | * | 12/1996 | Pascaru ...................... 285/373 |

* cited by examiner

Primary Examiner—Eric K. Nicholson
(74) Attorney, Agent, or Firm—John W. Wustenberg; Craig W. Roddy; Warren B. Kice

(57) ABSTRACT

A quick connect system and method for fluid devices according to which one end portion of a first tubular member is inserted in an end portion of a second tubular in a telescoping relationship. An arcuate clamp extends over the telescoping portions of the tubular members, and a tapered locking surface is formed on at least one of the tubular members and on the clamp. The tubular members move relative to each other in an axial direction in response to fluid pressure therein to move the tapered locking surfaces into engagement to lock the clamp against radial movement relative to the tubular members. A pipe assembly including a first connection system for connecting one end of a first pipe to one end of a second pipe while permitting relative rotation between the pipes, and a second connection system for connecting the other end of the first pipe to a third pipe so that rotation of the first pipe relative to the second pipe causes angular movement of the third pipe.

18 Claims, 3 Drawing Sheets

QUICK CONNECT SYSTEM AND METHOD FOR FLUID DEVICES

BACKGROUND

This invention relates to a system and method for connecting fluid devices and, more particularly, to such a system and method which permits the connection to be done easily and quickly.

In fluid flow environments, quick connect systems are often used to connect the corresponding ends of fluid devices, such as pipes, conduits, hoses, and/or fluid manifolds. However, the installation of many of the prior art quick connect systems is complicated, time consuming and often require tools and extensive manual labor. Also, when the flow lines or manifolds are relatively large, these quick connect systems are bulky and expensive. Moreover, these type of systems cannot be used when the fluid pressures in the flow lines and manifolds are relatively high. Also, these systems usually do not permit relative rotation between the connected flow lines and thus several limit the design possibilities when a multipipe assembly, including elbows, etc. is utilized. Although quick connect systems have been used in oilfield applications, they are usually made of iron, and are very heavy and hazardous. Also, hammer unions have been employed which are difficult and time consuming and often cause injuries.

Therefore, what is needed is a quick connect system and method which is simple, and easy to connect and disconnect without the need for tools, and employs components that are relatively small and easy to assemble and disassemble, yet permit relative rotation between the connected fluid lines.

SUMMARY

According to the system and method of the present invention, one end portion of a first tubular member is inserted in an end portion of a second tubular member in a telescoping relationship. An arcuate clamp extends over the telescoping portions of the tubular members, and a tapered locking surface is formed on at least one of the tubular members and on the clamp. The tubular members move relative to each other in an axial direction in response to fluid pressure therein to move the tapered locking surfaces into engagement to lock the clamp against radial movement relative to the tubular members.

BRIEF DESCRIPTION OF THE DRAWINGS

FIG. 3 is a longitudinal sectional view of the components of FIG. 2 shown assembled but prior to locking.

DETAILED DESCRIPTION

Figure 1:
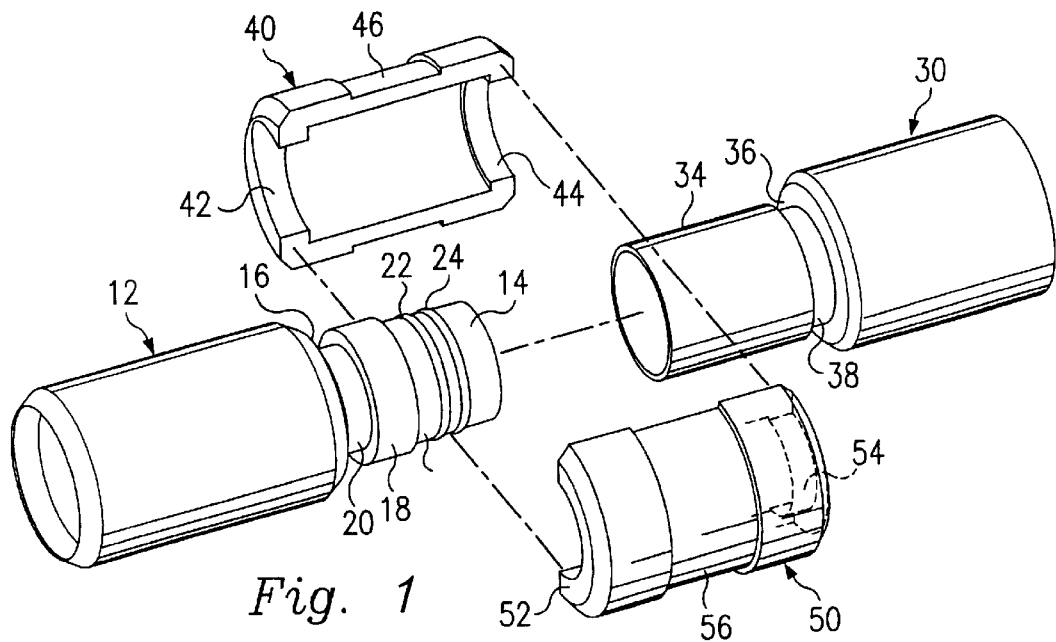
FIG. 1 is an exploded isometric view of a quick connect system according to an embodiment of the present invention.

With reference to FIG. 1, a quick connect system according to an embodiment of the present invention is shown, in general, by the reference numeral 10. The system includes a connector 12, in the form of a tubular member having a reduced-diameter end portion 14 that forms a shoulder 16. An external flange 18 extends between the end of the section 12 and the shoulder 16 and forms an annular groove 20 between the shoulder and the corresponding face of the flange. Two seal rings 22 and 24 are formed in corresponding grooves in the external surface of the end portion 14.

A connector 30 is also provided and is in the form of a tubular member having a reduced-diameter end portion 34 that forms a shoulder 36. An annular groove 38 is formed adjacent the shoulder 36 and extends between the shoulder and the corresponding opposite shoulder of the end portion 34 which will be described in detail later. The bore of the end portion 34 receives the end portion 14 of the pipe section 12 in a telescoping manner.

It is understood that any type of fluid flow device, such as a pipe, conduit, hose, or manifold (not shown), can be provided on the other end portions of the connectors 12 and 30 in any conventional manner such as by welding, molding, fastening or the like. The connectors 12 and 30 and/or the flow devices can be fabricated from a metal or a composite material.

An arcuate clamp 40 is provided and extends for approximately 180 degrees. Two arcuate flanges 42 and 44 extend from the inner surfaces of the respective end portions, and a central groove 46 is formed in the outer surface of the clamp 40 and extends for the entire arcuate dimension of the clamp.

An arcuate clamp 50 is also provided and is identical to the clamp 40. As such, the clamp 50 extends for approximately 180 degrees and two arcuate flanges 52 and 54 extend from the inner surfaces of the respective end portion. A central groove 56 is formed in the outer surface of the clamp 50 and extends for the entire arcuate dimension of the clamp.

Figure 2:
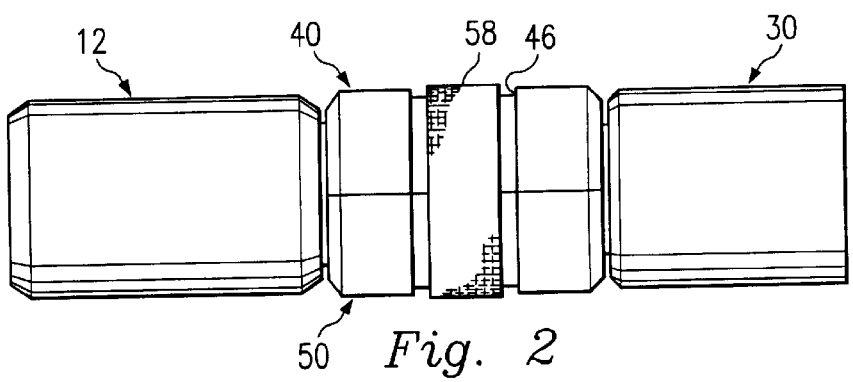
FIG. 2 is an elevational view of the assembled components of the system of FIG. 1.

FIG. 2 depicts the components of FIG. 1 in an assembled condition, with the clamps 40 and 50 extending over the reduced end portions 14 and 34 of the connectors 12 and 30 with their respective ends in an abutting relationship to form a continuous ring. A retaining strap 58 can be placed in the continuous groove formed by the grooves 46 and 56 prior to the clamps being locked to the connectors 12 and 30 in a manner to be described. The strap 58 can be in the form of a elastic band, or a hook-and-loop arrangement of the type marketed under the trademark VELCRO, sheet-metal clamp, a rubber tube, or any other similar type device.

FIG. 3 depicts the components of FIG. 2 in greater detail and before the clamps 40 and 50 have been locked to the connectors 12 and 30. In this position, that portion of the end portion 14 of the connector 12 extending from the flange 18 extends within the bore of the end portion 34 of the connector 20 in a telescoping relation. This telescoping portion of the end portion 14 is tapered radially inwardly in the direction towards the end of the pipe section 12 and forms a shoulder 14a against which the corresponding end of the connector 30 abuts. Also, an inner surface of the telescoping portion of the end portion 34 of the connector 30 defining the bore of the connector is tapered in a manner to receive the tapered portion of the end portion 14. The seal rings 22 and 24 engage the corresponding inner surfaces of the end portion 34 to seal against the egress of fluid from the continuous bore formed by the connectors 12 and 30 and their associated fluid flow devices.

The flanges 42 and 44 of the clamp 40 extend in the grooves 20 and 38, respectively, to form annular gaps G1 and G2 between the corresponding surfaces of the flanges and the end portions 14 and 34 of the connectors 12 and 30, respectively. Similarly, portions of the and the flanges 52 and 54 of the clamp 50 also extend in the grooves 20 and 38, respectively and also form annular gaps. As better shown in FIG. 4, the wall 34a of the end portion 34 extending opposite the shoulder 36 and forming, with the shoulder, the groove 38, is tapered radially outwardly from the bottom of the groove. Similarly, the corresponding wall 44a of the flange 44 of the clamp 40 is tapered in the same manner. In the unlocked position of FIGS. 3 and 4, the wall 44a of the flange 44 is spaced from the wall 34a to form the gap G2. The corresponding wall of the flange 42, as well as the corresponding walls of the end portion 14, are tapered in the same manner which, in the unlocked position of FIG. 3, form the gap G1. Similarly, the corresponding walls of the flanges 52 and 54 of the clamp 50 are configured in the same manner, which in the unlocked position, form gaps with the surface 34a and the corresponding surface of the end portion 14.

Figure 4:
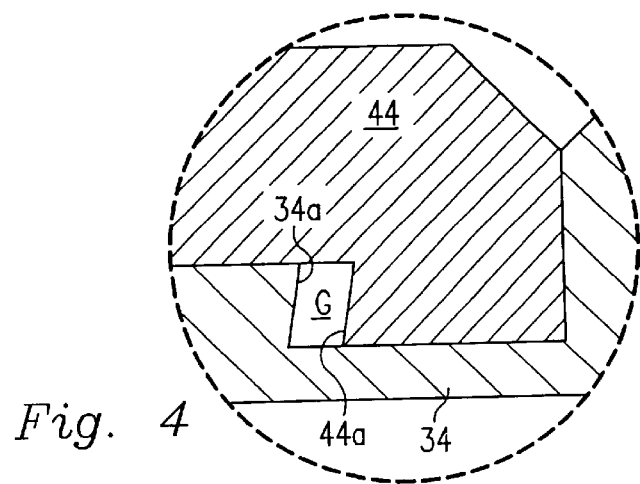
FIG. 4 is an enlarged view of the circled portion of FIG. 3.

The system is initially placed in the unlocked position of FIGS. 3 and 4 and the retaining strap 58 is positioned in the continuous groove formed by the grooves 46 and 56. The strap 58 functions to maintain the clamps 12 and 30 in the position shown before they are locked to the connectors 12 and 30.

Figure 5:
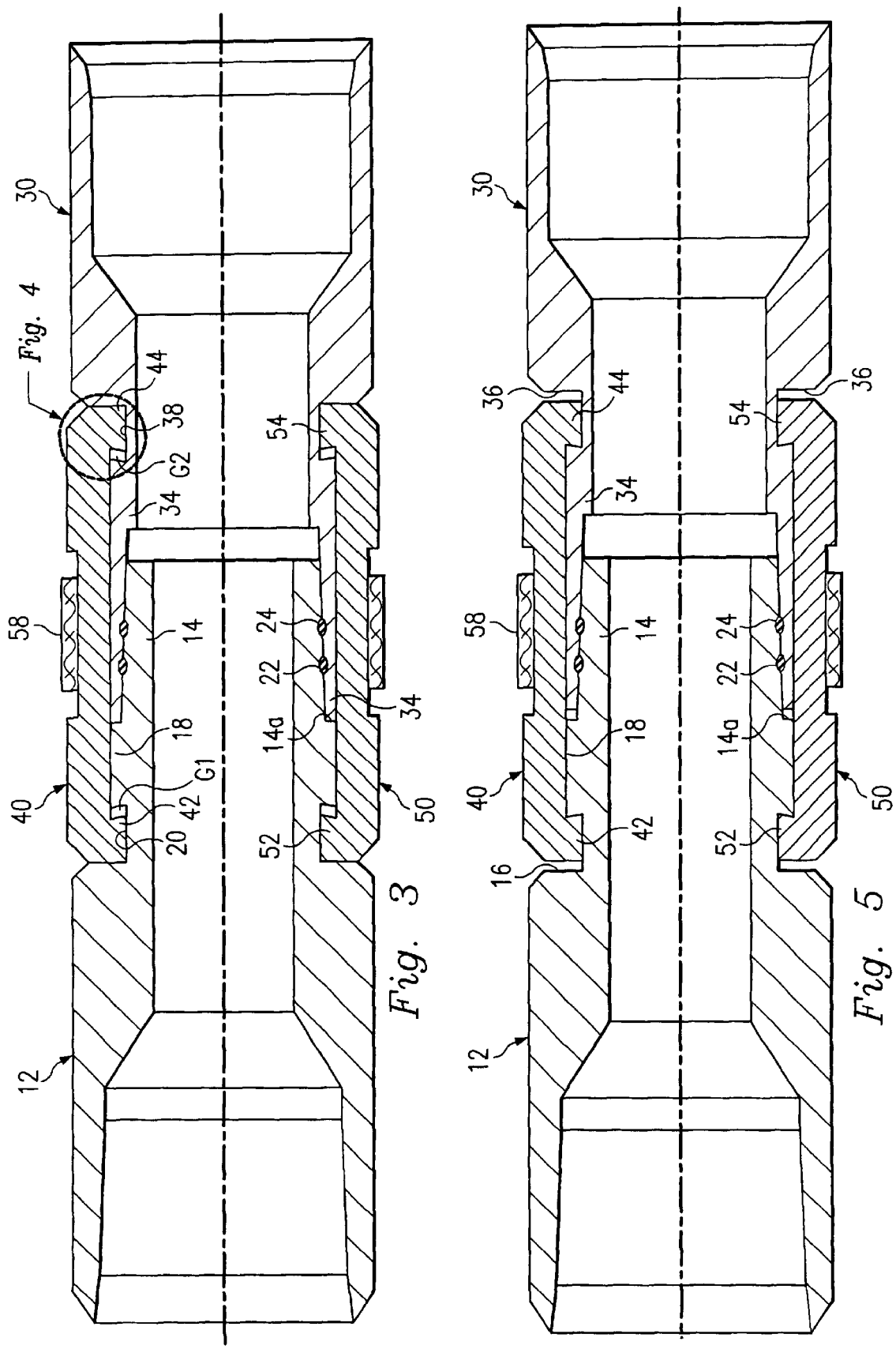
FIG. 5 is a view similar to that of FIG. 3, but depicting the components in a locked position.

The respective ends of the connectors 12 and 30 opposite the end portions 14 and 34 are each connected to, or formed integrally with, a fluid flow device (not shown) in the form of a pipe, conduit, manifold, or the like. When fluid pressure is applied to the system 10 via at least one of the fluid flow devices, the pressure forces the connectors 12 and 30 to separate slightly in an axial direction and move to the position of FIG. 5 in which the end of the connector 12 is slightly spaced from the shoulder 14a. In this position the tapered wall 34a (FIG. 4) moves into engagement with the tapered wall 44a of the flange 44 of the clamp 40 and the corresponding tapered wall of the flange 54 of the clamp 50. Also, the tapered wall of the end portion 14 moves into engagement with the corresponding tapered walls of the flanges 42 and 52 of the clamps 40 and 50, respectively to lock the clamps 40 and 50 to the connectors 12 and 30, as shown in FIG. 5. Although the strap 58 is shown in FIG. 5 it is not needed due to the above locking action.

Of course, when the fluid pressure in the system 10 is depleted, the strap 50 can be removed and the connectors 12 and 30 manually moved in an axial direction to the unlocked position of FIG. 3 to move the tapered wall 34a out of engagement with the tapered wall 44a of the flange 44 and the tapered wall of the flange 54; as well as move the tapered wall of the end portion 14 out of engagement with the corresponding tapered walls of the flanges 42 and 52. The clamps 40 and 50 can then be manually removed, in a radial direction, from their clamping position, and the connectors 12 and 30 can be separated by moving them away from each other in an axial direction, to disassemble the system 10.

Thus the system 10 is simple, and is quickly and easily connected and disconnected without the need for tools, while utilizing components that are relatively small and easy to handle.

Figure 6:
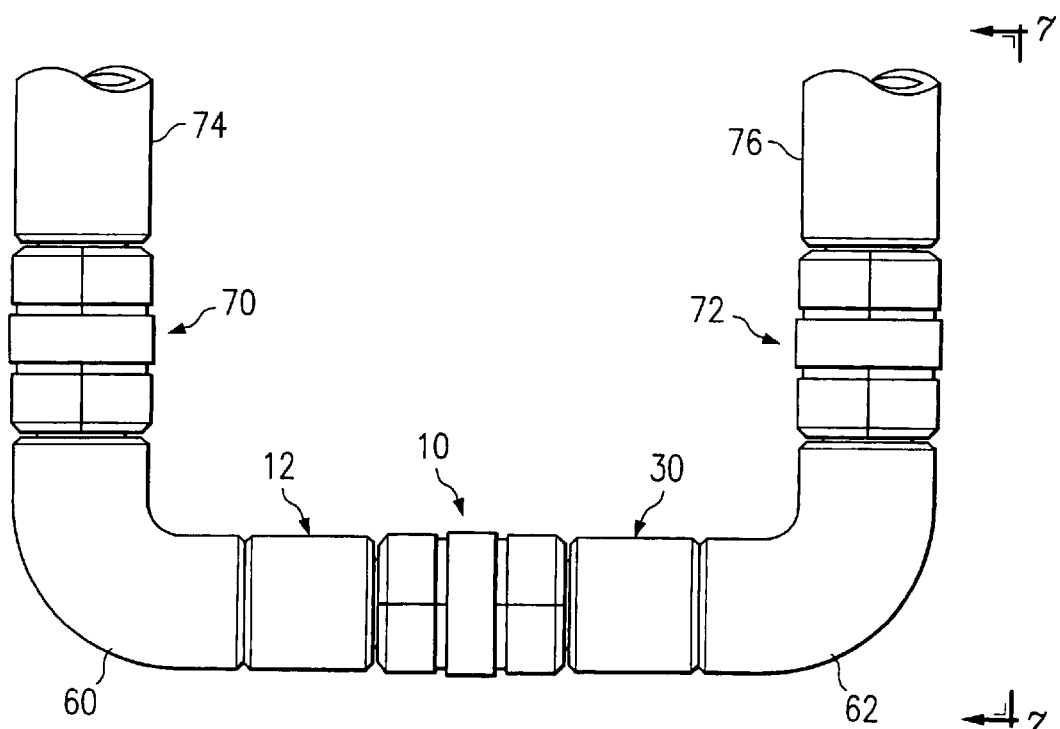
FIGS. 6–8 are elevational views, on a reduced scale, depicting the system of FIGS. 1–5 incorporated in a piping assembly.
Figure 7:
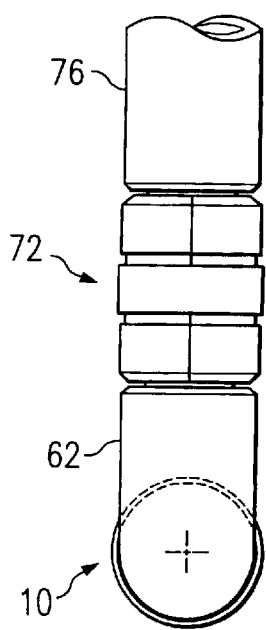
Figure 8:
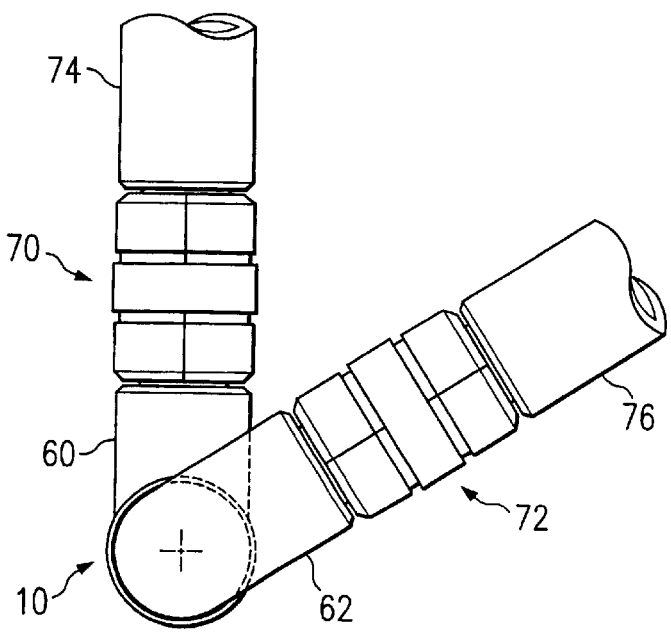

It is noted from the above, that, in the assembled condition of the system 10, the connectors 12 and 30 can rotate relative to each other. An embodiment employing this feature is shown in FIGS. 6–8 in which the system 10 is shown connected in a pipe assembly in a manner to permit relative rotation between the pipes in the assembly. More particularly, the connectors 12 and 30 of the assembled system 10 are connected to one leg of a pair of L-shaped, or elbow, pipes 60 and 62, respectively, in the manner discussed above. Two quick connect systems 70 and 72, which are identical to the system 10, connect the other leg of the pipes 60 and 62 to pipes 74 and 76, respectively. Although the pipes 74 and 76 are not shown completely, it is understood that they could be either straight or L-shaped.

The angular position of pipes 74 and 76, can be varied by rotating the connector 30 relative to the connector 12. Thus, as an example, the pipe 76 can be moved from a substantially vertical position, as viewed in FIGS. 6 and 7, in which it is in angular alignment with the pipe 74, to the position shown in FIG. 8 in which it extends approximately 45 degrees to the pipe 74. Of course, the angular positions which the pipe 76 can take are infinitely variable, and the angular position of the pipe 74 can be adjusted in the same manner. This feature is particularly advantageous in pipe assemblies including a series of L-shaped pipes since it permits a significant amount of flexibility in the particular angular positions of the pipes, and therefore the layout of the assembly.

It is understood that variations may be made in the foregoing without departing from the scope of the invention. For example, the interlocking tapered walls referred to above can only be formed on one end portion 14 or 34 and engage the tapered surfaces of the corresponding flanges 42 and 52, or 44 and 54. Also, reference to "pipe", and "conduit", are not meant to be limited to any particular fluid flow device and any such device or devices can be used throughout the system. Further, the number of clamps that are used can vary. Also, spatial references, such as "vertical", "angular", etc. are for the purpose of illustration only and do not limit the specific orientation or location of the structure described above. Still further, the specific design of the connectors 12 and 30 can be varied and, for example, may be formed integrally with the flow devices.

Since other modifications, changes, and substitutions are intended in the foregoing disclosure, it is appropriate that the appended claims be construed broadly and in a manner consistent with the scope of the invention.

What is claimed is:

1. A quick connect system comprising a first tubular member having a portion with a tapered external surface; a second tubular member having a portion with a tapered bore that receives the portion of the first tubular member in a telescoping relation; at least one of the portions having a tapered locking surface; and at least one clamp extending around at least a portion of the telescoping portions of the tubular members, the clamp having at feast one tapered locking surface; the tubular members adapted to move relative to each other in an axial direction in response to fluid pressure therein to move the tapered locking surface of the clamp and the tapered locking surface of the at least one portion into engagement to lock the clamp against radial movement relative to the tubular members.

2. The system of claim 1 wherein each of the portions has a tapered locking surface and wherein the clamp has two locking surfaces which engage the respective locking surfaces of the portions.

3. The system of claim 1 wherein there are two clamps that together extend around the telescoping portions of the tubular members.

4. The system of claim 3 wherein each of the portions has a tapered locking surface and wherein each clamp has two locking surfaces which engage the respective locking surfaces of the portions.

5. The system of claim 3 further comprising a retaining member extending around the clamps to retain the clamps against radial movement before the axial movement of the tubular members and the movement of the tapered locking surface of the one portion.

6. The system of claim 1 wherein the end portions of the first and second tubular members each have a reduced diameter portion for receiving the clamp.

7. The system of claim 1 wherein each of the portions has a groove formed in its external surface, and wherein the clamp has two spaced internal flanges formed therein which extend in the grooves.

8. The system of claim 7 wherein each groove defines two opposed shoulders and wherein the locking surfaces are formed on one of the shoulders defined by each groove.

9. The system of claim 8 wherein the locking surfaces of the clamp are disposed on the wails of its flanges facing the locking surfaces of the portions.

10. The system of claim 1 further comprising at least one seal ring extending between the telescoping portions of the first tubular member and the second tubular member.

11. The system of claim 1 wherein one end of each tubular member is connected to, or formed integrally with, a flow device for receiving the fluid.

12. A method of connecting two fluid flow devices, comprising the steps providing first tubular member on one of the flow devices, providing a second tubular member on the other flow device, tapering the external surface of an end portion of the first tubular member, tapering the internal surface of an end portion of the second tubular member, inserting the end portion of the first tubular member into the end portion of the second tubular in a telescoping relationship, positioning at least one arcuate clamp over the telescoping portions of the tubular members, forming a tapered locking surface on at least one of the tubular members, and forming at least one tapered looking surface on the clamp, the tubular members moving relative to each other in an axial direction in response to fluid pressure therein to move the at least one tapered locking surfaces of the clamp into engagement with the tapered locking surface of the at least one of the tubular members to lock the clamp against radial movement relative to the tubular members.

13. The system of claim 12 wherein a tapered locking surface is formed on each of the end portions and wherein two locking surfaces are formed on the at least one clamp which engage the respective locking surfaces of the end portions.

14. The system of claim 12 wherein two clamps are positioned around the telescoping portions of the tubular members.

15. The system of claim 14 wherein a tapered locking surface is formed on each of the end portions and wherein two locking surfaces are formed on the at least one clamp which engage the respective locking surfaces of the end portions.

16. The method of claim 12 wherein the movement of the tubular members is in a direction away from each other.

17. The method of claim 12 further comprising the step of forming two grooves in the external surfaces of the first and second tubular members, respectively, and forming two internal flanges on each clamp, the step of positioning comprising inserting the flanges of each clamp in the two grooves, respectively.

18. The method of claim 12 further comprising placing a retaining member around the clamps to retain the clamps against radial movement before the movement of the tubular members and the movement of the tapered locking surfaces.

* * * * *